United States Patent [19]  
Benuzzi

[11] 4,367,999  
[45] Jan. 11, 1983

[54] APPARATUS FOR THE AUTOMATIC DISCHARGE OF PANELS FROM A MACHINING LINE

[75] Inventor: Gino Benuzzi, Bologna, Italy

[73] Assignee: Giben Impianti S.p.A., Pianoro, Italy

[21] Appl. No.: 195,820

[22] Filed: Oct. 10, 1980

[30] Foreign Application Priority Data

Oct. 12, 1979 [IT] Italy ............................. 12771 A/79

[51] Int. Cl.³ .................................................. B65H 29/48
[52] U.S. Cl. ................................. 414/51; 271/189; 271/300; 414/83; 414/85
[58] Field of Search ................. 414/51, 76, 80, 82, 414/83, 84, 85, 86, 90; 271/189, 191, 300

[56] References Cited

U.S. PATENT DOCUMENTS

| | | | |
|---|---|---|---|
| 1,565,840 | 12/1925 | Wise | 414/86 X |
| 2,960,243 | 11/1960 | Beaulieu | 414/82 |
| 3,157,294 | 11/1964 | Bolt | 414/85 |
| 3,195,739 | 7/1965 | Hein et al. | 414/83 |
| 3,807,553 | 4/1974 | Billett et al. | 414/51 |

FOREIGN PATENT DOCUMENTS 2459571 7/1975 Fed. Rep. of Germany ........ 414/82  
537899 1/1977 U.S.S.R. ............................. 271/189

Primary Examiner—Leslie J. Paperner  
Attorney, Agent, or Firm—Pollock, Vande Sande & Priddy

[57] ABSTRACT

Apparatus for the automatic discharge of wood panels from the workpiece support (A) of a machining line onto lifting and lowering supports (8, 9) so as to form stacks of superposed panels, comprising a tilting table (1) which can be tilted around a fulcrum axis (2) so as to bring its discharge edge (101) in close proximity with the upper supporting surface of the lifting and lowering support (8, 9). Transverse abutment means (10, 14) cooperate with the supporting surface of the tilting table in such a manner that, whenever the inclined tilting table is horizontally moved transversally to the abutment means, the panels lying thereon are discharged onto the underlying lifting and lowering support, since they are prevented by the abutment means from following the movement of the tilting table.

4 Claims, 6 Drawing Figures

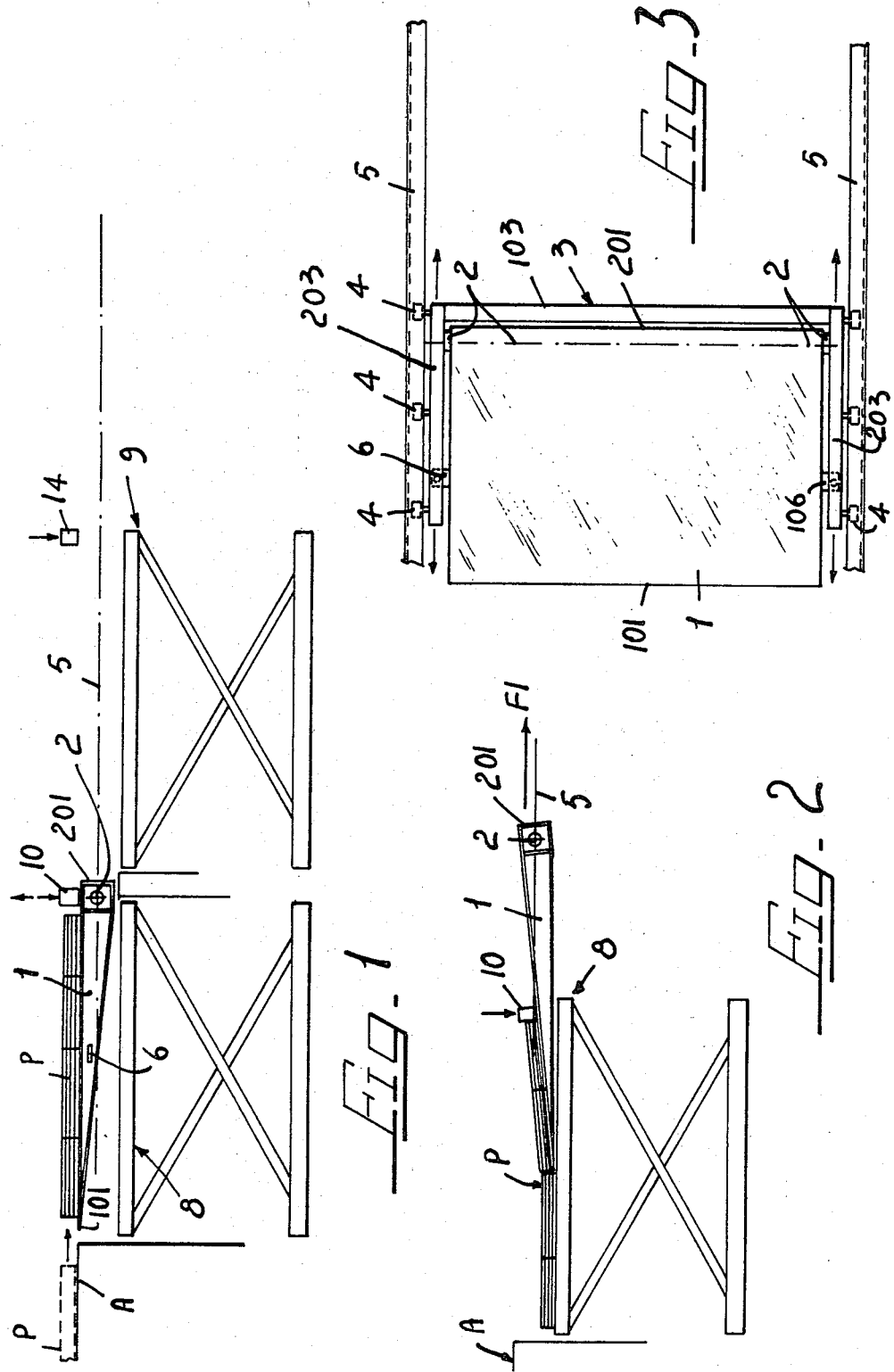

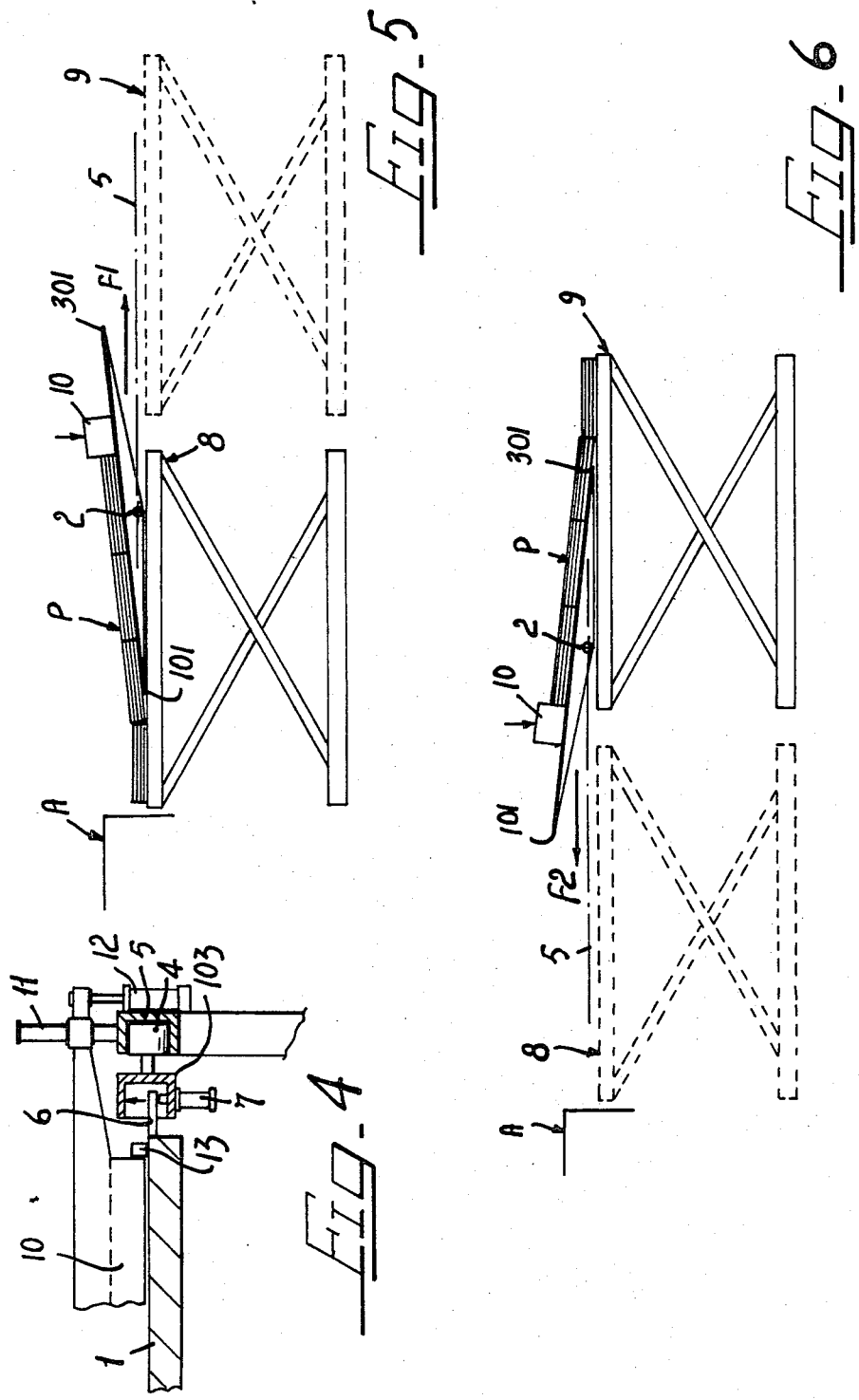

APPARATUS FOR THE AUTOMATIC DISCHARGE OF PANELS FROM A MACHINING LINE

The present invention relates to an apparatus for the automatic discharge of panels, and for instance wood panels, coming from a suitable machining line, e.g., a wood panel polishing and cutting line, onto lifting and lowering supports which receive the panels and form a stack of superposed panels. An apparatus of this type is disclosed, in British Pat. No. 1,405,065 in the name of the present applicant.

In the apparatus according to the said British patent, there is provided a horizontal support plane formed by a frame onto which a number of steel sheets are stretched, and which is arranged at a very short distance above the underlying lifting and lowering support, the said horizontal support plane being slidably guided so as to be movable in one direction transverse to the panel advancing direction on the workpiece support of the panel machining line, from a position in which it is aligned with the said workpiece support, to a position in which it is clear of said workpiece support. Fixed abutment means cooperate with the upper surface of said support plane to prevent the panels from following the transverse movement of the support plane.

In this manner, the panels are discharged from the support plane onto the underlying lifting and lowering support, without any remarkable drop, which could disassemble the stack which is being formed in orderly fashion, and without causing a panel or group of panels to slide over another panel or group of panels when they are stacked one over the other, with consequent scratching.

The above described apparatus, however, has the disadvantage that it requires frequent stretching of the steel sheets of the support plane, which have the tendency to become slacken due to the weight of the panels which they support. This requires a frame which is rather expensive, due to the cost of the steel sheets and of the sheet stretching devices. Moreover, during the discharge phase from the support plane to the underlying lifting and lowering support, the package of panels is arranged horizontally, so that, in order to cause its displacement, it is necessary to overcome completely the weight component of the said package.

The above and other disadvantages are obviated by the apparatus according to the present invention, which comprises a tilting table movably mounted on a horizontal plane at the level of the workpiece support of the panel machining line. The said tilting table can be inclined from a position in which its upper supporting surface is horizontal and coplanar with the workpiece support, and in which it receives the panels from the machining line, to a position in which the said supporting surface is inclined in such a manner that a discharge edge of the tilting table comes very close to the upper surface of the underlying lifting and lowering support. In this second, inclined position, the tilting table is shifted horizontally, after a vertically movable abutment bar has been lowered, in such a manner that the panels lying on the inclined supporting surface of the tilting table are discharged onto the underlying lifting and lowering support.

The tilting table according to the invention can be made sufficiently thick with respect to the previously mentioned support plane made of steel sheets, and it can therefore be constructed of materials which are less expensive than steel sheets, yet are sufficiently strong to support the weight of the panels. At the same time, the upper supporting surface of the tilting table can be provided with nozzles emitting air under pressure, so as to create an air cushion onto which the panels can slide; this is impossible in the case of a support surface made of steel sheets.

The above and other features of the invention, as well as the advantages deriving therefrom, will appear evident from the following description of two preferred embodiments of the apparatus according to the invention, made with reference to the attached sheets of drawings, in which:

FIGS. 1 and 2 show diagrammatically in side elevation an apparatus according to the invention, during two different phases of its operation.

FIG. 3 is a diagrammatic top plan view of the tilting table forming part of the apparatus and of the guides onto which it is movable.

FIG. 4 is a detail of a transverse section of the apparatus.

FIGS. 5 and 6 show diagrammatically in side elevation another embodiment of the apparatus according to the invention, during two different phases of its operation.

With particular reference to FIGS. 1 to 3, reference letter A indicates the workpiece support located at the discharge end of a line for machining wood panels P. The automatic discharge apparatus comprises a tilting table 1 which, in top plan view, has, a rectangular shape, and in side elevation, i.e. viewed from either one of the sides which are parallel to the direction of discharge of the wood panels P, it presents a right-angled triangular profile, i.e., a profile which gradually diminishes in thickness in the direction of the workpiece support A, in such a manner that the edge 101 of the tilting table 1 has a minimum thickness, in so far as the strength requirements of the said table 1 (which is intended to support a package of panels P) allow. By way of example, the tilting table 1 can be constructed of a suitable strong metallic frame comprising a plurality of triangular support brackets onto which there is arranged the surface plate of the table. The upper surface of the table 1, onto which the panels P must slide is preferably lined or coated with suitable anti-friction material, so as to facilitate the sliding. As an alternative or in combination with the said anti-friction lining or coating, the upper surface of the tilting table 1 can be provided with air nozzles emitting air under pressure, so as to create (in a known manner) an air cushion on which the panels P can slide.

On the side 201 which is opposite to the edge or side 101, the tilting table 1 is fulcrumed around a transverse axis 2, to a carriage 3, consisting of a transverse bar 103 and of two side bars 203 which are provided with rollers 4 so as to permit longitudinal movement (i.e. in the same direction as the direction of discharge of the panels P from the workpiece support) along rectilinear and parallel support guides 5 (see particularly FIGS. 3 and 4) said guides being supported by a suitable supporting frame (not shown). Drive means, such as for example chains (not shown) are provided for alternately moving the carriage 3 along the said longitudinal guides 5.

Tilting means are provided for tilting the table 1 from a first position (FIG. 1) in which it is arranged with its upper supporting surface horizontal, to a second position (FIG. 2) in which the upper supporting surface is inclined downwardly in the direction of the minimum thickness edge or side 101.

For this purpose, the tilting table 1 is provided with side lugs 6, 106 cooperating with fluid-pressure actuated cylinder and piston units 7, secured to the side bars 203 of the carriage 3 (FIG. 4). Suitable adjustable end abutment means (not shown) are provided for guaranteeing precision positioning of the tilting table 1 in the horizontal and in the inclined position.

Below the level of the tilting table 1, there are arranged two lifting and lowering support tables 8 and 9, which are of any type known in the art and which are incrementally lowered as they receive successively packages of panels P, from a position in which the said supporting tables 8 and 9 are just below the tilting table, to a position in which they are level with a carrier table which receives the package of stacked panels, after which the support table (8, 9) is again lifted to its starting position just below the tilting table 1.

With reference to FIGS. 1 and 4, it is to be noted that above the tilting table 1, parallel to and above fulcrum side 201, there is provided an abutment bar 10 which is mounted by its extremities for vertical movement along vertical column guides 11 secured to the support guides 5. The lifting and lowering of the said abutment bar 10 is controlled by means of piston and cylinder units 12. The abutment bar 10 is provided at its ends with rollers 13 which roll onto the upper surface of the table 1, in such a manner that the lower edge of the abutment bar 10 is kept at a slight distance from the said upper surface of the table 1, avoiding sliding or scraping contact.

If, as shown in FIG. 1, a second lifting and lowering support table 9 is provided, then a second abutment bar 14, mounted on the guides 5 in a similar manner as abutment bar 10 is provided above the said second support table, parallel to and above the rear end of the said support table.

The operation of the just described apparatus is as follows:

Upon starting of its working cycle, the tilting table 1 (see FIG. 1) is arranged with its upper supporting surface horizontal and coplanar with the supporting surface of the workpiece support A, and with its free edge 101 (i.e. the minimum thickness edge, opposite to the fulcrum edge 201) close to the discharge edge of the workpiece support A. At this stage, the package of panels P coming from the machining line can be transferred from the said workpiece support A onto the upper supporting surface of the tilting table 2 by any known means, for example pusher bars, which cause the sliding of the package of panels from the workpiece support A to the tilting table 1.

If the package of panels P is to be discharged on the first lifting and lowering support 8 (which in this case will be in its fully lifted position, immediately below the tilting table 1), then the table 1 is inclined downwardly, as shown in FIG. 2, under the action of piston and cylinder units 7, so as to bring the free edge 101 of the tilting table 1 as close as possible to the level of the upper supporting surface of the lifting and lowering support 8. At this point, the tilting table 1 is drawn horizontally along the guides 5, away from its initial position above the lifting and lowering support 8, in the direction of the arrow F1 (FIG. 2), while the abutment bar 10 is urged downwardly under the action of the piston and cylinder units 12, so as to practically "skim" at a constant minimum distance the upper supporting surface of the tilting table 1.

Due to the presence of the said abutment bar 10, the panels cannot follow the table 1 in its horizontal movement and are therefore discharged onto the underlying support 8. At this moment, the support 8 is lowered by an amount corresponding to the thickness of the discharged panels, and the tilting table 1 is returned to its starting position of FIG. 1. If the panels are to be discharged onto the second lifting and lowering support 9, then the abutment bar 10 is lifted so as to allow the passage of the table 1 (in horizontal position) carrying the package of panels. When the table 1 is above the support 9, the said table 1 is tilted downwardly and the abutment bar 14 is lowered, while the table 1 continues its horizontal movement away from the workpiece support A. In this manner, in a similar manner to what has been just described with reference to the support 8, the panels are discharged onto the support 9, which is then lowered by an amount corresponding to the thickness of the discharged panels.

In this manner, the following two main advantages are achieved:

The package of panels is transferred from the tilting table onto the lowering platform without any remarkable drop, which could disassemble the package being formed.

During the discharge from the table 1 onto the underlying support, the package slides on an inclined plane so that a portion of its weight is transformed in sliding component, which practically results in a lesser effort for the displacement of the package along the table.

With reference to FIGS. 5 and 6, there is shown a further embodiment of the discharging apparatus according to the invention, in which the tilting table presents in side view the profile of an isosceles triangle the base of which constitutes the upper supporting surface of the table, while the fulcrum axis 2 is arranged approximately along the vertex defined by the two equal sides of the triangle. The tilting table is tiltably mounted, in a similar manner as described with reference to the preceding embodiment, on a carriage capable of horizontal movement along the guides 5, and it can be tilted down in both directions around the fulcrum axis 2, i.e., either in the direction of the discharge edge 101 (FIG. 5), or in the direction of the other discharge edge 301 (FIG. 6).

If the package of panels P is to be discharged onto the first lowering support 8, the tilting table, after having been loaded in its horizontal position, is then inclined downwardly in the direction of edge 101, the abutment bar 10 is lowered, and then the table is horizontally moved away from the workpiece support A, thus causing the discharge of the panels onto the said lowering support 8.

If, on the other hand, the package of panels P is to be discharged on the second lowering support 9, the operation will be as follows:

The table, in its horizontal position, coplanar with the workpiece support A and with its edge 101 adjacent or close to the discharge edge of the said workpiece support A, is loaded with a package of panels P. After the said loading, the table, still in its horizontal position, is moved away from the workpiece support A, along the guides 5, until it comes to be located above the second lowering support 9; in the meantime, the abutment bar 10 has been raised so as to allow the passage of the package of panels P loaded on the table. Thereafter, the table is inclined in the direction of the edge 301, the abutment bar 10 is lowered and the table is then moved again in the direction of the workpiece support A. In this manner, the package of panels P will be discharged onto the second lowering platform 9, while at the same time the table moves again to its loading position, adjacent to the workpiece support A, ready for another loading operation.

It is apparent that, in the just described second embodiment of the apparatus, the length of the horizontal support guides 5 can be reduced, and only one abutment bar 10 is necessary, instead of two.

I claim:

1. Apparatus for the automatic discharge in a horizontal transfer direction of panels from a workpiece support (A) at the end of a machining line, comprising
   (a) first and second support tables (8, 9) movable upwardly and downwardly and sequentially arranged in said horizontal transfer direction;
   (b) a tilting table (1) mounted for to-and-fro movement with respect to said workpiece support in said horizontal transfer direction, said tilting table having a single discharge edge (101) facing said workpiece support;
   (c) said tilting table being tiltable about an horizontal axis transverse to said transfer direction, from a loading position in which the upper surface of said tilting table is substantially coplanar with said workpiece support, to a discharge position in which said upper surface is inclined downwardly and said discharge edge is adjacent to the effective upper surface of a said support table disposed beneath said tilting table;
   (d) abutment means (10, 14) comprising a horizontal bar arranged transversely to said transfer direction cooperating with said upper surface of said tilting table to prevent panels on said tilting table from following its transfer direction movement, whereby said panels are caused to be discharged over said discharge edge onto a said support table disposed beneath said tilting table, a said abutment means being provided above the end of each of said first and second support tables which is downstream with respect to said workpiece support; and
   (e) actuating means (12) for causing the lifting of said first abutment bar to a height sufficient to permit the passage therebeneath of said tilting table when loaded with panels to be discharged onto said second support table.

2. Apparatus according to claim 1, wherein said tilting table (1) is mounted on a carriage (3) movable on horizontal guides (5).

3. Apparatus according to claim 2, wherein said tilting table (1) is supported by said carriage (3) on a horizontal fulcrum axis (2) and on vertically actuating means (7) for causing the tilting movement of said table.

4. Apparatus for the automatic discharge in a horizontal transfer direction of panels from a workpiece support (A) at the end of a machining line, comprising
   (a) first and second support tables (8, 9) movable upwardly and downwardly and sequentially arranged in said horizontal transfer direction;
   (b) a tilting table (1) mounted for to-and-fro movement with respect to said workpiece support in said horizontal transfer direction, said tilting table having two discharge edges (101, 301) at opposite ends which can be brought selectively into close proximity with the upper surface of either one of said support tables disposed beneath said tilting table;
   (c) said tilting table being tiltable alternately in opposite directions about an horizontal axis transverse to said transfer direction, from a loading position in which the upper surface of said tilting table is substantially coplanar with said workpiece support, to a discharge position in which said upper surface is inclined downwardly and said discharge edge is adjacent to the effective upper surface of a said support table disposed beneath said tilting table;
   (d) abutment means (10) comprising a horizontal bar arranged transversely to said transfer direction cooperating with said upper surface of said tilting table to prevent panels on said tilting table from following its transfer direction movement, whereby said panels are caused to be discharged over said discharge edge onto a said support table disposed beneath said tilting table, said abutment means being located at a position between said first and second support tables; and
   (e) actuating means (12) for causing the lifting of said abutment bar to a height sufficient to permit the passage therebeneath of said tilting table when loaded with panels to be discharged onto said second support table.

* * * * *